(12) United States Patent
Barra et al.

(10) Patent No.: US 8,764,925 B2
(45) Date of Patent: Jul. 1, 2014

(54) APPARATUS AND METHODS FOR MANUFACTURING FIBER BUNDLES

(71) Applicant: Fresenius Medical Care Deutschland GmbH, Bad Homburg (DE)

(72) Inventors: Elmar Barra, Nalbach (DE); Hermann Reuschenbach, Munich (DE); Joern Hoermann, Heusweiler (DE)

(73) Assignee: Fresenius Medical Care Deutschland GmbH, Bad Homburg (DE)

( * ) Notice: Subject to any disclaimer, the term of this patent is extended or adjusted under 35 U.S.C. 154(b) by 0 days.

(21) Appl. No.: 13/666,142

(22) Filed: Nov. 1, 2012

(65) Prior Publication Data

US 2013/0086872 A1    Apr. 11, 2013

Related U.S. Application Data

(63) Continuation of application No. 12/312,988, filed as application No. PCT/EP2007/010296 on Nov. 27, 2007, now Pat. No. 8,327,901.

(30) Foreign Application Priority Data

Dec. 4, 2006   (DE) .......................... 10 2006 057 101

(51) Int. Cl.
*B29C 70/32* (2006.01)
(52) U.S. Cl.
USPC ............ 156/175; 156/169; 156/173; 156/174
(58) Field of Classification Search
USPC .......................... 156/166, 169, 174, 173, 175
See application file for complete search history.

(56) References Cited

U.S. PATENT DOCUMENTS

| | | | |
|---|---|---|---|
| 1,934,471 A * | 11/1933 | Kerr | 53/113 |
| 2,559,314 A | 7/1951 | Osborne | |
| 3,656,215 A * | 4/1972 | Tanno | 28/291 |
| 4,276,687 A | 7/1981 | Schnell | |
| 4,343,668 A | 8/1982 | Francisoud et al. | |
| 4,681,720 A | 7/1987 | Baumgart et al. | |
| 4,948,444 A | 8/1990 | Schutz et al. | |
| 5,449,430 A | 9/1995 | Porta | |
| 6,878,276 B2 | 4/2005 | Pedersen et al. | |
| 2006/0231193 A1 | 10/2006 | Bright | |

FOREIGN PATENT DOCUMENTS

| | | |
|---|---|---|
| DE | 1 945 876 | 6/1970 |
| DE | 1 560 600 | 10/1970 |
| DE | 31 02 331 | 9/1982 |
| DE | 198 06 293 | 8/1999 |
| EP | 0 116 155 | 8/1984 |

(Continued)

Primary Examiner — Jeff Aftergut
(74) Attorney, Agent, or Firm — Jacobson Holman PLLC

(57) ABSTRACT

An apparatus for the reeling up of fiber bundles, in particular of hollow fiber membrane bundles, and in particular for the manufacture of dialysis filters, includes a reel carrier rotatable around a main axis. The apparatus includes at least two reels which are rotatably supported on the reel carrier, with the axes of rotation of the reels being perpendicular to the main axis of the reel carrier. The apparatus can be used for the wrapping of a fiber bundle with a film, having a receiver of first and second side elements and a flexible channel fastened between them for the reception of the film and the fiber bundle. A drive is provided to move at least the first side element transversely to the channel, and at least one folding device movable transversely to the channel for the folding of the film around the fiber bundle.

31 Claims, 8 Drawing Sheets

(56) References Cited

FOREIGN PATENT DOCUMENTS

| | | |
|---|---|---|
| EP | 0 309 331 | 3/1989 |
| EP | 1 031 526 | 8/2000 |
| FR | 2 674 232 | 9/1992 |
| FR | 2 768 950 | 4/1999 |
| GB | 802713 | 10/1958 |
| GB | 1 277 513 | 6/1972 |
| JP | S46-16113 | 6/1971 |
| JP | 57-184065 | 11/1982 |
| JP | 09-221273 | 8/1997 |
| JP | 10 194606 | 7/1998 |
| JP | 10-194606 | 7/1998 |
| JP | 2001253638 | 9/2001 |
| JP | 2003-170027 | 6/2003 |
| JP | 2005 178979 | 7/2005 |
| JP | 2005-178979 | 7/2005 |

* cited by examiner

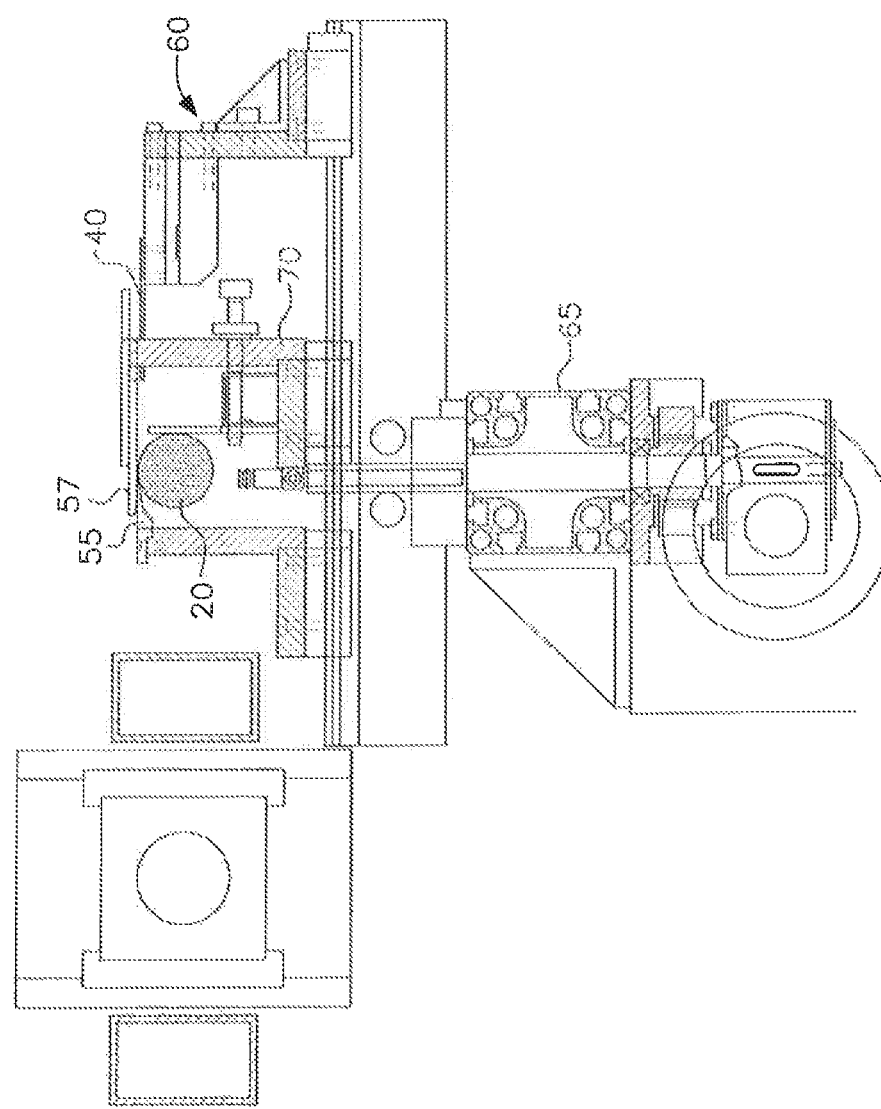

APPARATUS AND METHODS FOR MANUFACTURING FIBER BUNDLES

This application is a continuation application of U.S. application Ser. No. 12/312,988, filed Jun. 3, 2009, now allowed and issued as U.S. Pat. No. 8,327,901, the disclosure of which is incorporated by reference as if fully set forth herein. The aforementioned U.S. application Ser. No. 12/312,988 is a nationalization of PCT/EP07/010296 filed Nov. 27, 2007, and published in German, which claims priority to DE 10 2006 057 101.0, filed Dec. 4, 2006.

BACKGROUND OF THE INVENTION

1. Field of the Invention

The present invention relates to apparatus and methods for manufacturing fiber bundles, in particular hollow fiber membrane bundles, in particular for the manufacture of dialysis filters.

2. Description of the Prior Art

The main field of use of such fiber bundles is the manufacture of dialysis filters, i.e. of filters for extracorporeal blood treatment processes, for example for hemodialysis, hemofiltration and hemodiafiltration. In accordance with the prior art, fibers for such filters are manufactured by continuously operating hollow fiber spinning machines. The hollow fibers continuously exiting the hollow fiber spinning machine are usually wound batch-wise e.g. onto slowly rotating reel wheels. The reel wheels have winding mandrels distributed uniformly over the periphery and the hollow fibers lie on them. The hollow fibers are thereby freely tensioned between the winding mandrels. The spacings between the winding mandrels are selected such that one or two hollow fiber bundles arise between two respective winding mandrels. These hollow fiber bundles are wrapped with a thin plastic wrapping film by hand and fixed manually. As soon as the hollow fiber bundle has been fixed in this manner, it is cut off at the desired length by hand again using a cutting apparatus. Finally, the hollow fiber bundle is introduced into a cylindrical filter cartridge and the wrapping film of plastic is removed again. Manufacturing methods of this type are known, for example, from U.S. Pat. No. 4,276,687.

The manufacture of a long fiber bundle which is cut into a plurality of individual bundles after the reeling and wrapping is known from JP 10-194606 A. In this process, the membrane fiber is wound up onto a receiving wheel or reel wheel whose circumference corresponds to a multiple of the length of a finished hollow fiber bundle. As soon as the desired number of hollow fibers has been wound up, the complete hollow fiber strand is cut through at one point and pulled off the receiving wheel or reel wheel so that a linear hollow fiber strand is present which is now wrapped in a spiral form by a fixing tape and then cut to the desired length of the individual bundles. To realize a quasi continuous operation, two fixed receiving wheels are operated in parallel. The alternating transfer of the hollow fibers to the one or the other receiving wheel takes place by a movable hollow fiber feed. This method, however, has the disadvantage that pulling forces have to be exerted on the hollow fiber strand and frictional relative movements occur between the outer hollow fibers of the hollow fiber strand the guide elements of the machine. In addition, during the winding off, the position of the individual hollow fibers within a hollow fiber bundles necessarily also changes because the circumference of the individual wrapping increases in the radial direction during winding up. In addition, the spiral wrapping with a fixing tape is technically extremely complex and results in a low efficiency of the method.

A method for the wrapping of a fiber bundle is known from DE 198 06 293 A1 in which the fiber bundle is placed on a film into a bent over steel metal sheet which is thereupon allowed to spring back into its relaxed position in which it forms a cylinder and thus wraps the film around the fiber bundle. In this connection, however, the force exerted on the fiber bundle can only be controlled with difficulty since it substantially depends on the restoring force of the steel metal sheet so that the precision of the fiber bundles produced suffers.

SUMMARY OF THE INVENTION

It is therefore the object of the present invention to provide apparatus and methods for the manufacture of fiber bundles which have a complete automation, a quasi continuous manufacture and a high efficiency and precision.

This object is satisfied by an apparatus and a method for the reeling of fiber bundles in accordance with claims 1 and 25 respectively. Advantageous aspects of the invention form the subject of the dependent claims.

The apparatus in accordance with the invention for the reeling of fiber bundles, in particular of hollow fiber membrane bundles, in particular for the manufacture of dialysis filters, comprises a reel carrier which is rotatable around a main axis and at least two reels which are rotatably supported at the reel carrier. The axes of rotation of the reels stand perpendicular on the main axis of the reel carrier, i.e. each of the axes of rotation of the reels extends on its own in each case in a plane which is orthogonal to the main axis of the reel carrier.

This arrangement has the advantage that a hollow fiber strand can be reeled onto a first reel, while already reeled up fiber bundles can be further processed on the other reels. When the reeling onto the first reel has ended, the reel carrier is turned further one step so that the first reel with the fiber bundle reeled on is rotated into a further processing region, while a new empty reel is rotated into the reeling up region. The apparatus for the provision of the fiber strand such as a spinning machine and further processing machines such as a wrapping machine can thus therefore be arranged in a stationary manner while the reels each continue to rotate in their region respectively. The fiber strand thus does not have to be moved to and fro, which permits a more gentle processing of the fibers. The individual reels are also accessible a lot easier, which in particular facilitates the further processing. The fiber bundles can remain on the reels during the wrapping. An effective quasi-continuous processing of the fiber strand is thus possible.

The fact that the axes of rotation of the reels stand perpendicular on the main axis of the reel carrier makes it possible to use an extremely space-saving design of reel carrier and reels in which the region to be kept free for the rotation of the reel carriers with the reels can be kept small. This increases the accessibility of the apparatus in accordance with the invention, in particular for further processing steps. The reel carrier can in particular be substantially as long as the diameter of the reels, while the latter are arranged laterally at the reel carrier. If reels with more than two tines are used, only two reels are thus possible on respectively oppositely disposed sides, whereas the use of more than two reels is also possible on the use of two-tine reels. An extremely compact construction results in any case in which in particular the torques to be moved by the reel carriers can also be kept small even with very large reels.

The at least two reels advantageously in each case substantially comprise a reel bar with reel heads having winding mandrels arranged at the ends of the reel bar. Such two-tine reels in particular have the great advantage in the present invention that they can be arranged parallel to the reel carrier during the rotation thereof and thus only have minimum space requirements. Furthermore, the fiber bundles reeled onto such a two-tine reel can be further processed directly on the reel, whereby the transfer step or the removal of the fiber bundle from the reel is omitted. It is in particular possible to wrap the reeled on linear fiber bundle immediately.

The spacing between the reel heads advantageously amounts to three times the length of the filter portions of dialysis filters manufactured using the hollow fiber membrane bundles. The cutting losses can thus be very considerably reduced using the present invention. These cutting losses are around 10% in the prior art and can be approximately halved by the present invention. The spacing between the reel heads in this process advantageously amounts to at least five times the length, and even more advantageously, to at least ten times the length of the filter portions manufactured with the hollow fiber membrane bundles.

The reel heads advantageously comprise stretch/compression devices with which the winding mandrels can be moved so that the reeled on fiber bundle can be stretched and/or compressed. This in particular permits a stretching during molding as well as a tensile stress relief of the fiber bundle during the further processing. It can be ensured by this tensile stress relief that the fiber bundles do not shrink further after cutting to their final length.

In this process, the stretching/compression devices advantageously move in a linear fashion along the main extent of the reel bar. A simple compression or stretching of the reeled on fiber bundle can thus be effected.

Two reels are advantageously provided in the present invention which are arranged at oppositely disposed sides of the reel carrier and whose axes of rotation are in particular arranged in parallel or advantageously coaxially.

For instance, a fiber strand can be reeled on the first reel on one side of the apparatus, while a fiber bundle already reeled on the second reel is further processed on the other side. If the reeling on and the further processing are completed, the reel carrier is rotated by 180° so that fiber bundles reeled on the first reel can be further processed, while a new fiber bundle is being reeled onto the second reel. The use of only two reels permits an exceptional accessibility of the respective reels and thus in particular a particularly simple further processing.

The apparatus in accordance with the invention advantageously comprises respective separately controlled drives for each of the reels for the rotation of the reels. This makes the effective automation of the method possible.

The apparatus furthermore advantageously comprises a drive for the rotation of the reel carrier around a fixed angular range, in particular around 180°. When more than two reels are used, the angular range corresponds in each case to 360° divided by the number of reels.

The drives for the rotation of the reels are advantageously arranged at the reel carrier. This makes a simple and compact construction of the apparatus possible.

The reel carrier is advantageously formed by a drum in which, for example, the drives for the reels as well as control lines can be integrated.

The reels furthermore advantageously respectively comprise grips for the holding of the start and of the end of a fiber strand. The fiber strand can thus be fixed to the reel at the start of the reeling on process. These grips are advantageously arranged in the proximity of the winding mandrels in order thus to keep cutting losses low at the start and at the end of the fiber strand. If the predetermined thickness of the fiber bundle has been reached after a specific number of rotations of the reel, the reeling process is ended and the end of the fiber strand is again fixed to the reel so that the fiber strand can be cut.

The apparatus in accordance with the invention advantageously furthermore comprises a transfer grip for the reception of a fiber strand from one of the reels and for the transfer of the fiber strand to the next reel. If therefore the reeling on one of the reels has ended, the transfer grip takes over the fiber strand and holds it tight for so long until the next reel has been rotated into the region of the transfer grip and can take over the fiber strand. This in particular makes a quasi-continuous operation possible.

The apparatus in accordance with the invention advantageously furthermore comprises a cutting apparatus for the cutting off of the fiber strand.

The apparatus in accordance with the invention for the reeling on of fiber bundles advantageously furthermore comprises an apparatus for the provision of a fiber strand, in particular a spinning machine. This apparatus makes the fiber strand available which is reeled onto the reels. This will usually be a spinning machine with continuous manufacture of hollow fiber membrane fibers.

The apparatus in accordance with the invention advantageously furthermore comprises an apparatus for the storage and/or tautening of the fiber strand, in particular a dancer arrangement. This apparatus makes it possible to operate the apparatus in accordance with the invention quasi-continuously. Short breaks in the reeling process, which arise when a new reel is rotated into the region of the spinning machine e.g. by rotating the reel carrier, can thus be bridged in that the continuously provided fiber strand is stored in the apparatus for the storage of the fiber strand. Fluctuations in the reeling on speed can equally in particular be compensated in the use of two-tine reels. This apparatus can equally serve the manufacture of a uniform fiber strand tension. A dancer arrangement is a particularly advantageous apparatus for the storage and/or tensioning of the fiber strand.

The dancer roll in such a dancer arrangement is advantageously equipped with a low-mass pulling force apparatus, in particular with a torque-controlled servo motor. This has the advantage in comparison with dancer arrangements having a weight-loaded pulling force apparatus that the natural frequency of the dancer arrangement can lie considerably higher and that oscillations can thus be largely avoided.

The dancer roll can furthermore advantageously be locked and moved with the help of a servo motor e.g. when the pulling force is applied to the fiber strand by a suction apparatus, e.g. on the starting of the unit or during a defect when the reel apparatus is not working.

A thread tension measuring device is furthermore advantageously provided in the apparatus in accordance with the invention The thread tension of the fiber strand can be measured via this, which in particular permits a regulation of the apparatus for the tensioning of the fiber strand, in particular of the dancer arrangement. A constant thread tension of the reeled on fiber strand can thus be set.

Furthermore an apparatus for the further processing of the reeled on fiber bundle, in particular a wrapping machine, is furthermore advantageously provided in the apparatus in accordance with the invention for the reeling on of fiber bundles. Transfer processes such as in the prior art are hereby omitted so that the material flow does not need to be interrupted. The apparatus in accordance with the invention thus makes a quasi-continuous operation possible. The two-tine reel in accordance with the invention in particular also makes possible a particularly simple wrapping of the reeled on fiber bundle since the accessibility is increased. The arrangement in accordance with the invention having at least two reels whose axes of rotation stand perpendicular on the axis of rotation of the reel carrier thus makes it possible to reel on one reel and further process on the other reels simultaneously with only small space requirements.

Advantageously, the apparatus for the further processing of the reeled on fiber bundle can be moved toward the reel for the reception of the fiber bundle. The apparatus for the further processing of the reel is moved away for the rotation of the reel carrier to make room for the rotation. A new reel is thereupon rotated into the region of the further processing and the apparatus for the further processing is again moved to the reel. The wrapping machine can thus be vertically movable so that it is moved downward for the rotation of the reels and thus releases the radius of rotation while it can be moved upwardly toward the reel for the reception of the fiber bundle.

An apparatus for the provision of a fiber strand and an apparatus for the further processing of the reeled on fiber bundle are advantageously provided in the apparatus for the reeling on of fiber bundles of the present invention, with the reels being able to be rotated by rotation of the reel carrier sequentially in the region of the apparatus for the provision of the fiber strand and of the apparatus for the further processing of the reeled on fiber bundle. This makes the quasi-continuous processing of the fiber strand possible which was already described further above.

The axis of rotation of the reel carrier furthermore coincides with its longitudinal axis in the apparatus in accordance with the invention for the reeling on of a fiber bundle. A particularly space-saving construction is thus in particular made possible since the reels can thus be arranged laterally at the reel carrier and the total construction of reel carrier and reels is not much larger than a single reel when two-tine reels are used.

The axis of rotation of the reel carrier is advantageously arranged horizontally. On the further processing of the fiber bundle, this in particular makes possible a particularly simple accessibility of this fiber bundle in that the two-tine reels are arranged parallel to the reel carrier.

The present invention furthermore advantageously comprises a method for the reeling on of fiber bundles, in particular of hollow fiber membrane bundles, in particular for the manufacture of dialysis filters which has the same advantages in accordance with the invention as the apparatus described above. In this method, a reel arrangement is used with which a reel carrier rotatable around a main axis and having at least two reels which are rotatably supported at the reel carrier, with the axes of rotation of the reels standing perpendicular on the main axis of the reel carrier. The method in accordance with the invention comprises the following steps: reeling of a fiber bundle on a first reel; rotating of the reel carrier around the main axis; further processing of the fiber bundles on the first reel; and simultaneous reeling of a fiber bundle on the next reel. This method makes a quasi-continuous operation possible and is highly efficient. The material flow from spinning machine may, for example, in particular not be interrupted. The reeling on of the fiber strand by rotation of the reels around an axis which stands perpendicular on the axis of rotation of the reel carrier also makes it possible to rotate the reel carrier without having to keep a larger region free for this purpose. This makes possible a high accessibility of the fiber bundle, in particular in the further processing step.

In the method in accordance with the invention, on the reeling on by the rotation of a reel bar, the fiber strand is advantageously wound around winding mandrels arranged at its ends so that the reeled on fiber bundle extends along the reel bar. Such a reeling onto a two-tine reel permits an exceptional accessibility of the reeled on fiber bundle in particular in combination with the axes of rotation of the reels and of the reel carrier standing perpendicular on one another.

In the method in accordance with the invention, the length of the reeled on fiber bundle advantageously amounts to at least three times the length of the filter portions of dialysis filters manufactured with hollow fiber membrane bundles. A very long fiber bundle can thus be manufactured in one reeling process which is thereupon cut in the further processing into individual fiber bundle portions which then correspond to the hollow fiber membrane bundles required for the filter portions of the dialysis filters. A very large number of individual filter portions can thus be manufactured in one step, with the cutting losses additionally being able to be substantially reduced. Only a minimal off-cut thus in particular results on the use of a two-tine reel and of the correspondingly long linear bundle. The length of the reeled on fiber bundle advantageously amounts to five times, and furthermore advantageously eight times, the length of the filter portions manufactured with the hollow fiber membrane bundles.

The next reel advantageously adopts the position previously adopted by the first reel by the rotation of the reel carrier around the main axis in the method in accordance with the invention. By rotating the reel carrier around a fixed angular range, a loaded reel is thus rotated in the region of a further processing machine for further processing, while an empty reel is rotated into the region of a spinning machine, for example, for the renewed reeling on.

Advantageously, the axis of rotation of the reel carrier coincides with its longitudinal axis in the method in accordance with the invention and the reels each substantially comprise a reel bar with reel heads having a winding mandrel arranged at the ends of the reel bar, with the reel bars being brought into a position substantially parallel to the reel carrier before the rotation of the reel carrier. The radius of rotation to be kept free for the rotation of the reel carrier can in particular thus be minimized. An arrangement thus results in which, for example, apparatus for the further processing only have to be rotated out of the radius of rotation of the reels by a small distance, which substantially increases the efficiency of the method.

The reel bar of a loaded reel advantageously remains in its substantially parallel position with respect to the reel carrier during the further processing step. More than two reels can thus also in particular be used. An exceptional accessibility of the fiber bundle reeled on the reel moreover results.

The fiber strand is advantageously provided continuously in the method in accordance with the invention, in particular by continuous spinning of the fiber strand, with the fiber strand being stored intermediately in a storage apparatus, wile the next reel is provided by rotation of the reel carrier. Continuous spinning machines can thus be used and a quasi-continuous operation of the reeling machine becomes possible. The fiber strand produced during the time which is required for the provision of an empty reel is stored intermediately in the storage apparatus. Such a storage apparatus advantageously comprises a dancer arrangement.

The reel is advantageously operated at a higher rotational speed until the fiber strand stored in the storage apparatus falls below a certain length, whereupon the reel is operated at a lower rotational speed. The lower rotational speed advantageously corresponds to the usual reeling on speed, while the higher rotational speed is used to reel on the material stored during the provision of the reel.

In the method in accordance with the invention, the fiber strand is furthermore advantageously continuously provided, in particular by continuous spinning of the fiber strand, whereas the fiber strand is reeled on at fluctuating speed, in particular on start-up or stopping of the reel and/or by rotation of the reel at a substantially constant speed, with the fluctuating speed of the reeling being compensated by a storage apparatus.

Since the reeling on speed has an irregular course corresponding to a rounded saw tooth at a constant rotational speed of the reel in particular when a two-tine reel is used, the storage of the continuously provided fiber strand can again balance these fluctuations. The same applies on the start-up of the reels at the start of the reeling process and on the stopping of the reels at the end of the reeling process.

The rotational speed of the reel is advantageously readjusted if certain limit values for the fiber strand stored in the storage apparatus are fallen below or exceeded. It is thus ensured that the storage capacity of the storage apparatus is not exceeded and that nevertheless a continuous operation is possible. If these upper and lower limit values for the length of the fiber strand stored in the storage apparatus are not exceeded or fallen below, the reel can in contrast be operated at a constant rotational speed. The control effort for the drive of the reels is thus substantially decreased.

The tension of the fiber strand is advantageously in particular set via the storage device in the method in accordance with the invention. A particularly uniform fiber bundle can thus be achieved.

The tension of the fiber strand is advantageously measured via a thread tension measuring device and readjusted as required. This readjustment in turn advantageously takes place via the storage device.

The fiber strand is furthermore advantageously held under tension via a dancer roll of the storage apparatus, in particular via a low-mass pulling force apparatus such as a torque-controlled servo motor, in particular in conjunction with a smooth toothed belt drive. A precise setting of the tension of the fiber strand can thus be achieved, on the one hand; on the other hand, an unwanted oscillation of the storage device can in particular be avoided by the low-mass pulling force apparatus.

The start of the fiber strand is advantageously clamped to the reel in the method in accordance with the invention for the reeling on of fiber reels, whereupon the reeling starts and ends after a fixed number of rotations, whereupon the end of the fiber strand is also clamped to the reel. A fixed fiber bundle is thus reeled on the reel after the reeling on and is ready for further processing.

In the method in accordance with the invention, the fiber strand is advantageously furthermore taken up by a transfer grip after the reeling up of the fiber bundle on a first reel, cut and transferred to the next reel after rotation of the reel carrier. This makes a quasi-continuous operation of the reeling on or further processing possible.

The loose ends of the fiber strand are advantageously gripped by grips.

In the method in accordance with the invention, the tensile stress in the reeled on fiber bundle for the further processing of the fiber bundle is furthermore advantageously reduced by displacement of the winding mandrels. It can thus in particular be ensured that the length of the fiber bundle is not reduced again after the further processing, which increases the fitting precision of the fiber bundles manufactured.

The fiber bundle divided into two by the winding on around the winding mandrels of a two-tine reel is furthermore advantageously brought into a substantially circular cross-section. When a two-tine reel is used, two individual fiber bundles separated from one another by the size of the winding mandrels are present which extend parallel and next to one another and are thus combined to one single fiber bundle. Since the fiber bundles divided into two parts are brought into a substantially circular cross-section, the further processing such as the wrapping of the fiber bundle is facilitated and the precision of the method is increased.

The fiber bundle is advantageously furthermore wrapped with a film band in the method in accordance with the invention for the reeling up of fiber bundles, the length of said film band corresponding to the length of the fiber bundle. In particular the exceptional accessibility of the fiber bundle in the further processing makes this step possible so that a removal of the fiber bundle from the reel and a following spiral wrapping can be dispensed with. A single film band is rather used in the method in accordance with the invention which is wound around the fiber bundle still reeled on the reel over the total length of the fiber bundle. This makes possible a particularly fast and simple wrapping which guarantees a uniform processing over the total length of the fiber bundle.

The fiber bundle is advantageously compressed by the wrapping with the film. The desired diameter of the fiber bundle can thus be set automatically by the winding with the film.

The film wound around the fiber bundle is furthermore advantageously fixed, in particular welded.

The fiber bundle is furthermore advantageously cut into a plurality of smaller bundle portions in the method in accordance with the invention. If therefore a very long fiber bundle is reeled on which amounts to a multiple of the bundle portion required for a filter portion of a dialysis filter, a plurality of bundle portions can be manufactured by cutting the reeled on fiber bundle into a plurality of smaller bundle portions extremely efficiently and cost-effectively with minimal cutting losses in one workstep. The non-usable parts of the fiber bundle in the region of the 180° deflections at the reel mandrels are disposed of by means of a suction apparatus after the clamping apparatus have been opened.

One of the apparatus for the reeling up of fiber bundles, which were described further above, is furthermore advantageously used in the method in accordance with the invention. This in particular also results in the advantages shown there.

Furthermore, the present invention comprises an apparatus and a method for the wrapping of a fiber bundle as described herein. Advantageous embodiments of the aforementioned apparatus and method are also described herein.

Such an apparatus for the wrapping of a fiber bundle, in particular a hollow fiber membrane bundle, in particular for the manufacture of dialysis filters using a film, comprises a receiver made of first and second side elements and a flexible channel fastened between them for the reception of the film and of the fiber bundle, with a drive being provided to move at least the first side element transversely to the channel. Furthermore, at least one folding device for the folding of the film around the fiber bundle is provided which is movable transversely to the channel.

One such apparatus permits a simple and automatic wrapping of a fiber bundle in that first the fiber bundle is placed on a foil into the flexible channel, the film is thereupon placed around the fiber bundle by a movement of the folding device into the region of the channel and the film is thereupon wrapped around the fiber bundle and the fiber bundle is compressed by moving the side elements toward one another. A fiber bundle can thus be wrapped with a film band quickly over its total length, with the packing density of the fiber bundle and its diameter being simultaneously able to be set in a precisely reproducible manner. The otherwise frequently occurring deviations can in particular be precluded by the drive for the movement of the side element. The drive can take place pneumatically, hydraulically or by a motor.

The length of the fiber bundle to be wrapped advantageously amounts to at least three times the length of the filter portions of dialysis filters manufactured with hollow fiber membrane bundles. A very long fiber bundle can thus initially be wrapped which is thereupon cut into a plurality of partial bundles. This makes a particularly efficient processing possible. The length of the fiber bundle to be wrapped advantageously furthermore amounts to five times the length and furthermore at least ten times the length of a filter portion manufactured from the hollow fiber membrane bundle.

The apparatus in accordance with the invention for the wrapping of a fiber bundle furthermore advantageously comprises an apparatus for fixing, in particular for the welding of the film placed around the fiber bundle. This apparatus advantageously only welds the ends of the films together which are folded over one another, without fixing the film to the fiber bundle.

The apparatus furthermore advantageously comprises an apparatus for the cutting of the fiber bundle into a plurality of portions. After the wrapping and optional fixing of the film, the fiber bundle can thus be cut into a plurality of portions which then correspond to the filter portions of the dialysis filters. The channel and the side elements are interrupted at the points where the cutting apparatus severs the bundle. The apparatus for the cutting of the fiber bundle advantageously comprises at least one cutting instrument movable along the fiber bundle.

The channel of the apparatus for wrapping a fiber bundle advantageously has cut-outs through which the folding device can be moved. The folding device can thus be moved beneath the top edge of the channel in its region, which permits a particularly effective folding over of the film. The channel furthermore advantageously comprises cut-outs through which a fixing can be carried out. The fiber bundle compressed by the movement of the side elements can thus first be secured in its shape by the fixing of the film before the channel opens again to release the fiber bundle or the fiber bundle portions.

Advantageously, in the present invention, a front edge of the first side element facing toward the channel can be moved past the front edge of the second side element facing toward the channel so that the flexible channel is bent to form a cylinder. In this connection, the size of the cylinder can advantageously be varied by a further movement of the first side element. The fiber bundle can thus be compressed while it is simultaneously wrapped with film. It is advantageously possible in this connection to set different diameters for the fiber bundle.

In a first embodiment variant of the present invention, the flexible channel has cut-outs along its longitudinal side facing the first side element where it is fastened to the second side element at its other longitudinal side and/or vice versa. This makes it possible to push the front edge of the second side element through the cut-outs on the other side in the flexible channel so that the flexible channel forms a cylinder.

In this connection, at least one of the side elements advantageously has projections and cut-outs, with the flexible channel being fastened to the projections and the cut-outs in the side element merging into cut-outs along this longitudinal side of the channel. The projections of the side element together with a part of the longitudinal side of the flexible channel fastened to them can thus project into the cut-outs on the other side of the flexible channel and pass through them so that the diameter of the cylinder formed by the flexible channel can be set.

For this purpose, the projections of the side elements advantageously pass through the cut-out of the oppositely disposed longitudinal side of the channel on a movement of the side elements toward one another.

Both side elements advantageously have projections and cut-outs. This permits a particularly stable design of the flexible channel.

Advantageously, the flexible channel comprises a material which has a low coefficient of friction with the film used since, in the first embodiment variant of the apparatus for the wrapping of a fiber bundle in accordance with the invention described above, the film slides in the flexible channel to permit a smooth contact of the film on the fiber bundle to be further compressed.

The flexible channel advantageously comprises a thin metal sheet or a steel film. This, on the one hand, permits a very stable, flexible channel which, on the other hand, has the required low coefficient of friction with the film.

In a second embodiment variant, the edge of one of the side elements to which the flexible channel is fastened is shaped as a knife edge. The corresponding edge of the other side element can then be moved over the knife edge and thus push the end of the film lying on the fiber bundle underneath the other film end contacting the knife edge. This embodiment has the advantage that the flexible channel only has a few apertures and the film thus lies on practically everywhere.

In this connection, the spacing between the upper side of the knife edge and the lower side of the edge of the other side element is advantageously small in comparison with the diameter of the flexible channel so that the knife edge is located only just beneath the oppositely disposed edge. It is hereby in particular achieved that the compressed fiber bundle does not become unround.

The flexible channel advantageously comprises a material whose coefficient of friction with the film used is higher than the coefficient of friction of the film used. It is hereby achieved that the film does not slide on the flexible channel due to the friction, but that the film is carried along by the movement of the flexible channel. The end of the film contacting the knife edge can thereby be pushed over the free end of the film already placed around the fiber bundle.

The flexible channel advantageously comprises a fabric cloth, in particular made from a thin and/or gummed fabric cloth. This in particular permits a high coefficient of friction with the film.

The fabric cloth is advantageously attached to the continuous edges of the side element and sags between them. This sagging fabric cloth now forms the flexible channel. The diameter of the fiber bundle can be set via the sagging of the wrapping cloth or the travel path of the apparatus.

The present invention furthermore comprises a method for the wrapping of a fiber bundle, in particular of a hollow fiber membrane bundle, in particular for the manufacture of dialysis filters, with a film, with the fiber bundle in a first step being placed on a film in a receiver of first and second side elements and a flexible channel fastened between them. Thereupon, at least one free longitudinal side of the film is placed around the fiber bundle using a folding device movable transversely to the channel, whereupon the side elements are moved toward one another by control of a drive for the movement of at least one of the side elements.

This method permits an automated wrapping of the fiber bundle with film, with the movable folding device permitting a simple folding of the film and the movement to be controlled of the side elements and additionally also an exact compressing of the fiber bundle. Fiber bundles can thus be manufactured simply and efficiently with exceptional precision.

The fiber bundle is advantageously compressed by the movement of the side elements. Different diameters of the fiber bundle can advantageously be set.

The film is furthermore advantageously fixed, and in particular welded to itself, after the folding. The fiber bundle is furthermore advantageously cut into a plurality of fiber bundle portions.

The length of the fiber bundle to be wrapped advantageously amounts to at least three times the length of the filter portion of dialysis filters manufactured with the hollow fiber membrane bundle. The length furthermore advantageously amounts to five times and furthermore advantageously to at least ten times this length. A plurality of fiber bundle portions can thus be manufactured in a single workstep.

Advantageously, a front edge of the first side element facing toward the channel can be moved past the front edge of the second side element facing toward the channel so that the flexible channel is bent to form a cylinder. The fiber bundle can thus be compressed and wrapped particularly simply.

In a first alternative embodiment of the method, both longitudinal sides of the film are free and are placed sequentially over the fiber bundle by the folding device so that they overlap. For this purpose, folding devices respectively movable transversely to the channel, are arranged on both sides of the channel. In this method alternative, the fiber bundle is therefore first completely wrapped and then compressed by movement of the side elements.

At least one of the side elements advantageously has projections forming a front edge which are moved through corresponding cut-outs on the oppositely disposed side of the channel so that the channel forms a cylinder.

The film advantageously slides along the surface of the flexible channel. This permits a compression of the fiber bundle to a set diameter without resulting in creases in the film.

In a second alternative embodiment of the method, a first longitudinal side of the film is pushed by an edge of a side element shaped as a knife edge underneath the edge of the other side element. Only one free side is thus folded onto the fiber bundle by a folding device, while the other side still contacts the knife edge and is moved by it.

The first longitudinal side, which contacts the knife edge, is advantageously pushed over the free longitudinal side lying on the fiber bundle. The fiber bundle is thereby simultaneously wrapped and compressed.

For this purpose, the film is advantageously moved along by the flexible channel due to the friction with it. Since the friction between the film and the flexible channel is larger than the friction of the film sides on one another, the films can be moved along by the movement of the side elements so that the end held tight slides over the free end and the fiber bundle is thus wrapped without creases.

The method in accordance with the invention for the wrapping of a fiber bundle is advantageously used with the apparatus described further above for the winding of a fiber bundle. The same advantages as with the apparatus result.

The present invention furthermore comprises an apparatus for the making up of a fiber bundle, in particular of a hollow fiber membrane bundle, in particular for the manufacture of dialysis filters, which comprises a combination of one of the apparatus for the reeling up of fiber bundles of the present invention as well as an apparatus for the wrapping of a fiber bundle of the present invention. In particular since the axes of rotation of the reels stand perpendicular on the main axis of the reel carrier in the apparatus for the reeling on of fiber bundles of the present invention, only a very small region to be kept free is required for the rotation of the reel carrier and thus for the change of a reel between the reel position and the wrapping position so that the apparatus for the wrapping of the fiber bundle is advantageously arranged next to and parallel to the reel carrier and only has to be moved vertically to place the fiber bundle into the flexible channel.

A special advantage is furthermore that, when a two-tine reel is used, the fiber bundle reeled on such a reel is very easily accessible. This fiber bundle comprising two individual strands is advantageously first pushed together to form a single fiber bundle and then wrapped with film. On the cutting of the long fiber bundle into individual smaller fiber bundle portions, the fiber bundle can simultaneously be separated from the winding mandrels on which it is still tensioned up to then.

The present invention furthermore comprises a corresponding method for the making up of a fiber bundle, in particular of a hollow fiber membrane bundle, in particular for the manufacture of dialysis filters, which comprises a combination of one of the methods described above for the reeling of fiber bundles and one of the methods described above for the wrapping of a fiber bundle. The advantages already described above in turn result.

It is particularly advantageous for the fiber bundle to remain tensioned on the reel while it is wrapped with film. The individual fiber strands can thus not be displaced with respect to one another and the fiber bundle maintains the correct shape during the wrapping.

BRIEF DESCRIPTION OF THE DRAWINGS

The present invention will now be described in more detail with reference to embodiments and drawings. There are shown

FIG. 9: a further side view of the second embodiment of the apparatus in accordance with the invention for the wrapping of a fiber bundle;

A fiber spinning machine in accordance with the prior art produces a large number of individual hollow fibers simultaneously, e.g. 768 individual fibers. The individual fibers of a spinning machine are supplied to the reeling machine combined together as a common strand. From the strand, the reeling machine produces the hollow fiber bundles which are made up in further worksteps. Making up is understood as the wrapping of the bundles with a wrapping film, the fixing of the wrapping film wound around the bundle and the cutting of the wound bundle to the required length. The wrapping film in this making up process is an auxiliary means and has the purpose of holding the fiber bundle in shape and making possible the reliable introduction of the fiber bundle portion into the filter cartridge. After the later introduction into the filter cartridge, the wrapping film is pulled out and the fiber bundle portion expands in the cartridge.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modification within the spirit and scope of the invention will become apparent to those skilled in the art from this detailed description.

The present invention describes a new reeling machine with integrated bundle making up for the automated manufacture and making up of hollow fiber membrane bundle portions. The subject of this invention is the reeling machine and the reeling method including the automatic transfer of the hollow fiber membrane bundle to a new bundle making up apparatus. The hollow fibers are manufactured in a fiber spinning machine in accordance with the prior art and are transferred to the dancer apparatus of the new reeling machine.

Figure 1:
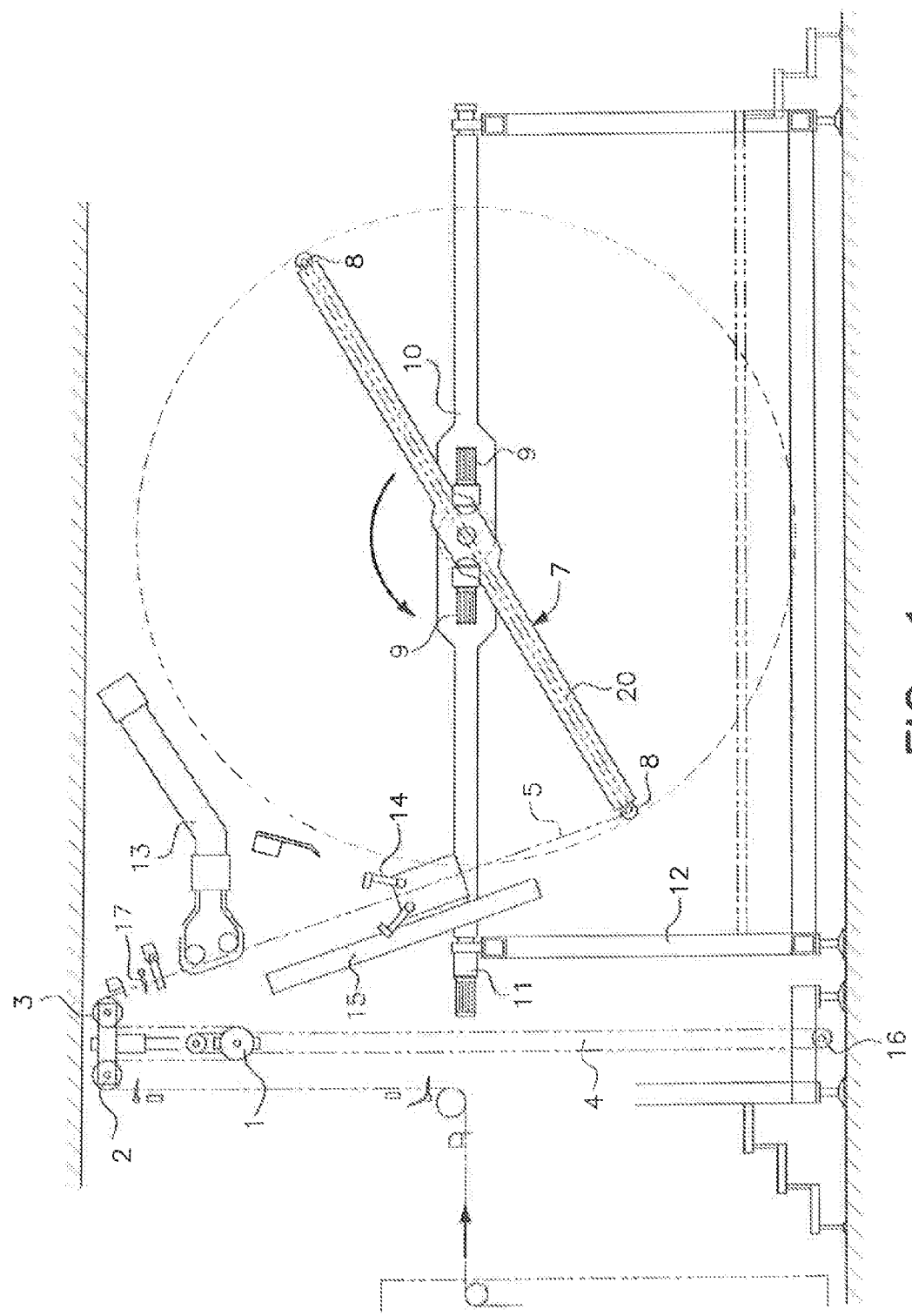
FIG. 1: a side view of an embodiment of the apparatus in accordance with the invention for the reeling up of fiber bundles.
Figure 2:
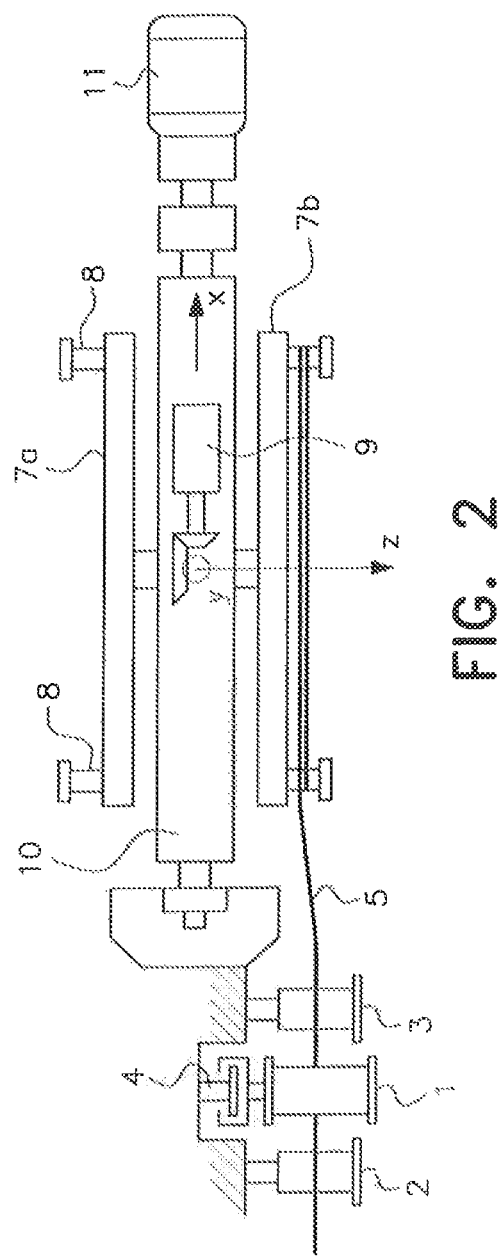
FIG. 2: a plan view of the embodiment of the apparatus in accordance with the invention for the reeling up of fiber bundles.
Figure 3:
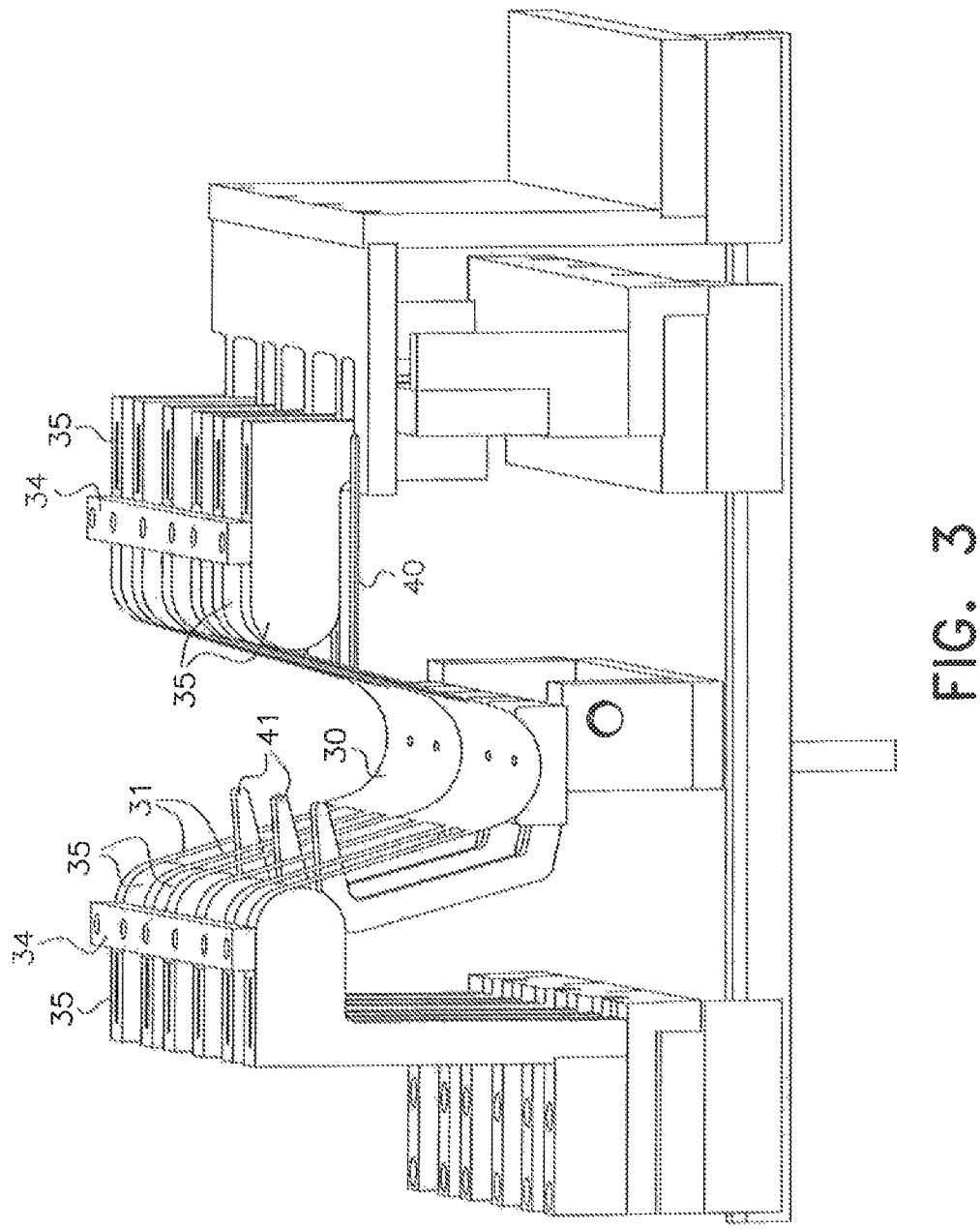
FIG. 3: a perspective view of a first embodiment of the apparatus in accordance with the invention for the wrapping of a fiber bundle.
Figure 4:
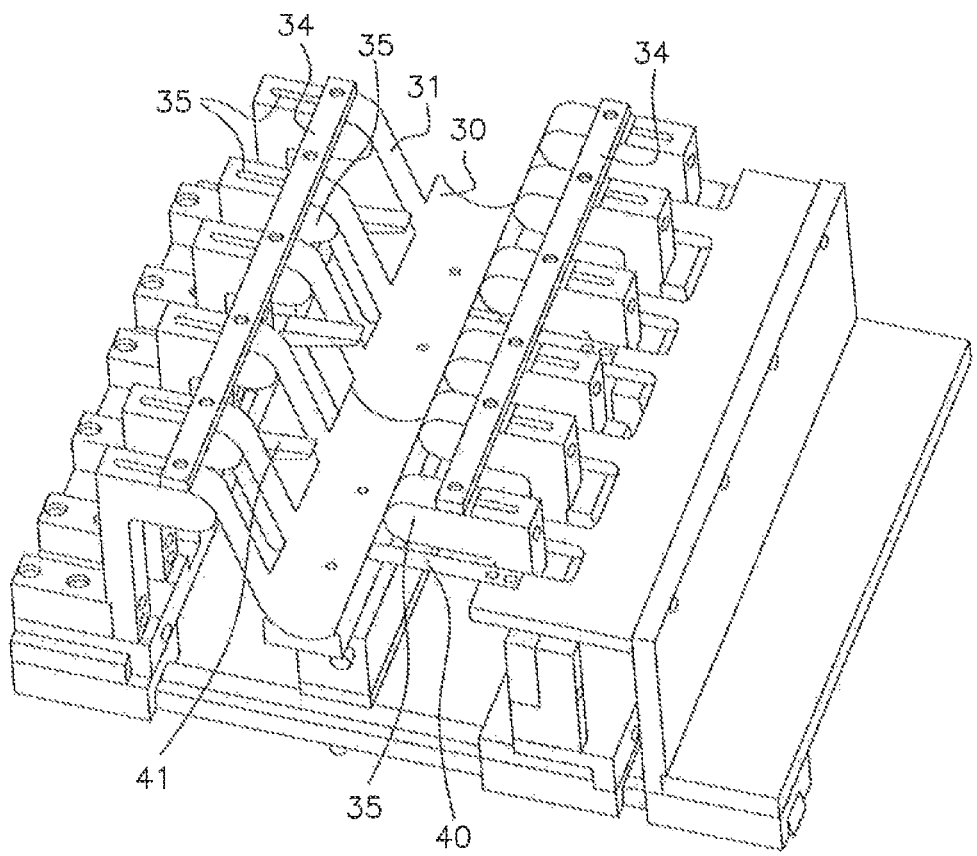
FIG. 4: a further perspective view of the first embodiment of the apparatus in accordance with the invention for the wrapping of a fiber bundle.
Figure 5:
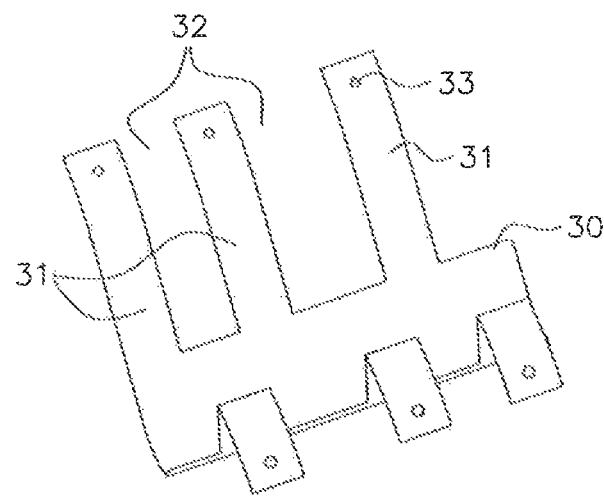
FIG. 5: a perspective view of the wrapping metal sheet used in the first embodiment of the apparatus in accordance with the invention for the wrapping of a fiber bundle.

The embodiment of the invention shown in FIG. 1 and FIG. 2 shows reels 7 whose axes of rotation stand perpendicular on the main axis of the reel carrier 10, i.e. the axes of rotation of the reels 7 and the main axis of the reel carrier 10 are arranged with respect to one another such that there is in each case a plane which stands perpendicular on the main axis of the reel carrier 10 and in which the axis of rotation of the reel extends. The spacing of the axes of rotation of the reels from the main axis of the reel carrier can hereby be smaller than the radius of rotation of the reels, which results in a particularly compact arrangement. So that after a rotation of the reel carrier the following reel adopts the same position as the preceding reel, the axes of rotation of the reels furthermore extend in a common plane. In addition, the axes of rotation of the reels have the same spacing from the main axis of the reel carrier. In the embodiment shown in FIGS. 1 and 2, this spacing is equal to zero so that the axes of rotation of the reels 7 intersect the main axis of the reel carrier 10.

The embodiment shown in FIGS. 1 and 2 in this respect shows a drum 10 which serves as a reel carrier and is rotatably supported around a main axis. Two oppositely arranged reel bars 7 are rotatably supported at the drum 10, with the coaxial axes of rotation of the reel bars 7 standing perpendicular on the main axis of the drum 10. The winding mandrels 8, which are disposed far apart, are arranged at the ends of the reel bars 7 so that the tracking fiber strand 5 is wound up by the winding mandrels 8 on the rotation of the reel bars 8.

At the start of the reeling process, the start of the fiber strand is held tight at one of the reel bars 7, preferably at one of the two winding mandrels 8, by means of a grip ("start clamp"). After the reeling, the fiber strand is fixed to one of the two winding mandrels 8 by means of a further grip ("end clamp") and is then cut through, with the free end of the strand 5, that is the start of the next bundle, being held by a transfer grip 14 which subsequently transfers the strand to a further reel bar 7 or to its start clamp. The cutting through of the fiber strand can take place by means of a cutting apparatus integrated in the grip.

At least two reel bars 7 are supported at a drum 10 rotatable about an axis of rotation, with the axes of rotation of the reels 7 standing perpendicular on the axis of rotation of the drum 10. It is thereby possible to reel quasi-continuously on one reel bar, while the second loaded reel bar automatically transfers its fiber bundle to making up. A quasi-continuous linking of the spinning process and the hollow fiber bundle making up is thus possible, in particular since the length of the reeled on fiber bundle is much longer than the length of a finished bundle portion. A particularly gentle processing of the sensitive hollow fibers takes place by the reeling.

A plurality of fiber bundle portions can be made simultaneously in one workstep from a bundle reeled on between the winding mandrels 8 using the present invention. The transfer processes of the prior art are omitted. The reel bar 7 can have a length of a plurality of meters.

The new reeling machine manufactures bundles 20 which are a great deal longer than the length of a finished bundle portion (e.g. a plurality of meters in length). The bundle 20 is transferred to making up with its total length and is wrapped in its whole length with wrapping film 25 automatically from the roll. The wrapping film 25 is e.g. automatically fixed by welding and the bundle is then automatically cut into bundle portions of approx. 200-300 mm in length. The wrapping apparatus is integrated into a movable wrapping table and can be moved toward the reel bar 7 e.g. from below or from the side for the reception of the bundle 20. The bundle 20 has an almost circular cross-section through the wrapping with film 25.

The spinning speed at the thread exit from the spinning machine amounts to approx. 0.4-0.5 m/s. The reel bar 7 requires an average of 14 seconds for one rotation. The rotation speed of the reel bar is variable, because the thread length stored with the help of the dancer 1 is first wound up at the start of the wrapping process.

A reel machine produces a wrapped and cut bundle portion every 9 seconds on average (with the medium filter size FX 60). The removal of the cut bundle portions from the wrapping apparatus and the transfer to a conveyor belt takes place by means of a suction rail. The wrapping table moves vertically toward the suction rail for this purpose. The suction rail transfers the bundle portions to a conveyor belt. The transport away from the machine for further processing takes place with the help of the conveyor belt.

While one winding mandrel pair reels on the fiber strand supplied from the spinning machine, the already completely reeled on strand can be further processed, i.e. wrapped with film, welded and cut to length, on the other reel bar in the oppositely disposed position of the drum. More than 2 winding mandrel pairs are also feasible at a drum, e.g. 4 winding mandrel pairs at the circumference of the drum. Then the reeling process can e.g. take place at one winding mandrel pair, while simultaneously the further making up steps such as being wrapped with film, welded and cut to length take place at the three other winding mandrel pairs.

Preferably, however, only 2 winding mandrel pairs are made so that the drum is cycled on by 180° in each case.

As already mentioned above, a clamping device is present at each winding mandrel 8 to clamp the start of a new strand tight to the winding mandrel (start clamp). For this purpose, a pivotable clamping hoop moves toward the winding mandrel and presses the end of the fiber strand against the winding mandrel. The start clamp hoop is wrapped around with fibers during reeling. Furthermore, a clamping apparatus of just this type is present to fix the end of a reeled on strand (end clamp).

The two winding mandrels 8 are installed at reel heads which are displaceable along the reel bars 7 in a linear manner. A stretching and compression device thereby results for the reeled on fiber bundle 20, with a normal position during reeling, a stretched position during molding and a compressed position which corresponds to the final length of the fiber bundles on wrapping.

During a rotation of the reel bar 7, the fiber strand 5 is pulled over the last pulley block 3 at greatly varying speeds, i.e. coming to a stop briefly in the two dead center positions of the reel 7, increasing therebetween with an asymmetric sinusoidal course up to the maximum. A dancer roll 1, which oscillates accordingly on its vertical axis 4, provides a balance of these speed fluctuations. When the amplitude of the dancer roll movement exceeds an upper or lower limit value, the rotational speed of the reel bar is slowly readjusted until a constant inertia value has been adopted again. The level of the dancer roll oscillation is probably in the upper region of the vertical axis 4. The dancer roll thereby still has sufficient capacity as a buffer store when the reel 7 is full and the thread strand 5 is transferred to the next following free reel.

When the required pulling force is exerted on the dancer roll 1 in accordance with the prior art with a weight G, a spring-mass system results together with the elastic fiber strand which tends toward natural frequency oscillations under unfavorable circumstances. A pulling force apparatus is therefore expedient which is as free of mass as possible, e.g. a torque-controlled servo motor 16 in conjunction with a smooth toothed belt drive. The dancer roll 1 can in this case be made particularly light so that the natural frequency is much higher and resonant oscillations are avoided. The servo motor provides a constant torque which can optionally also be readjusted in dependence on the output signal of an additional thread tension measuring device. In addition, the dancer roll 1 can also move into fixed positions such as is expedient at the start and end of the reeling process without a pulling force regulation.

The reeling up takes place with the following steps:
Starting Position Prior to Start-Up:

The fiber strand 5 delivered from the production plant runs over the dancer roll system (1, 2, 3) and is ejected by a suction tube 13 after it—between the last pulley block 3 and the reel bar 7. In this connection, the dancer roll 1 is in a fixed vertical position, i.e. without applying a pulling force.
Start of the Reeling Process The transfer grip 14 takes up the strand 5 above the suction tube 13 and cuts through it directly after the clamping point. At the same time, the dancer roll 1 switches to the operating mode "pulling force".

The severed end of the strand is sucked up, while the start of the following strand is guided by the transfer grip to the next disposed winding mandrel 8 of the reel 7 where it is transferred to the start clamp.

The strand material later delivered during this transfer procedure is stored in the dancer apparatus in the meantime.

Reeling

The reel bar starts to rotate, first at a higher speed of rotation than corresponds to the normal production speed. The oscillating dancer roll gradually migrates upward until the desired vertical position is reached. The reel speed is now reduced in accordance with the mean strand speed, regulated by the above-described amplitude monitoring.

When the desired number of rotations has been reached, the reel bar is fixed at a defined position and the end of the strand is fixed by the end clamp. The later delivered strand material is now stored in the dancer roll apparatus again.
Transfer:

The transfer grip 14 now severs the stationary strand 5, holds the end which has become free tight until the drum 10 with the full reel has rotated through 180'° and transfers then the end to the start clamp of the new empty reel, etc.

During a defect, or on the termination of the reel work, the transfer grip 14 can again transfer the strand to the suction tube 13.

The following advantages result with the reeling machine in accordance with the invention:
a) Reduction of the cutting losses. In accordance with the prior art, the cutting losses are below 10% (at the medium filter size FX60 approx. 8%) of the produced fiber amount. It can be estimated that these losses can be approximately halved by the machine in accordance with the invention.
b) Easy accessibility in the realization of automated film wrapping devices. In accordance with the prior art, the space for the transfer of the bundles into the wrapping apparatus is very limited. The bundle is easily accessible due to the long bundle with the new machine. This facilitates the automation.
c) Simple handling through the possibility of operating partially or fully automatic wrapping apparatus online using the spinning machine. The new wrapping apparatus is integrated in the reeling machine. Transfer processes in accordance with the prior art which interrupt the material flow such as the replacement of the loaded reel wheels by empty reel wheels and the manual making up of the bundles with the help of a separate apparatus are thereby omitted. A quasi-continuous operation is made possible overall by the new machine.

Furthermore, a first embodiment of the wrapping machine in accordance with the invention will be described with reference to FIGS. 3 to 7. It is possible with it to wrap fibers in film in an automated manner. An improvement in the geometrical properties of the fiber bundles with reproducible quality is achieved with the automation. The handling in the following processes can thus be improved and ensured. With the help of the wrapping apparatus having an integrated wrapping metal sheet 30, a fiber strand 20 can be wrapped with a film 25 and can subsequently be compressed to a defined diameter to achieve a specific packing density, for example. In the following processes, this film 25 can now be fixed (by means of adhesive bonding, welding, etc.) and bundles can be cut out of the strand 20.

The invention is based on a thin stainless steel film 30 which is therefore termed a wrapping metal sheet in the following. This wrapping metal sheet 30 shown in detail in FIG. 5 has fingers 31 on oppositely disposed longitudinal sides and cut-outs 32 disposed therebetween, with the fingers on the one longitudinal side being disposed opposite the cut-outs on the oppositely disposed longitudinal side. The wrapping metal sheet 30 is connected via the fingers 31 to connection points 33 having side elements 35 which can be pushed over a drive.

Figure 7:
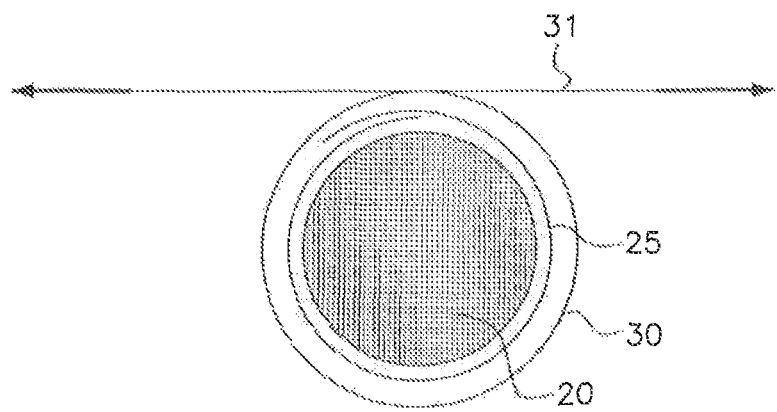
FIG. 7: a sectional view of a wrapped fiber bundle in accordance with the first embodiment of the apparatus in accordance with the invention for the wrapping of a fiber bundle.

The wrapping film (here: blue PE film) is pulled into the channel formed by the wrapping metal sheet 30 and is placed around the fiber strand over its total length by two folding devices 40, 41 such that the two longitudinal edges overlap. The folding devices can each comprise a plurality or tines or fingers. With long folding devices, a plurality of tines or fingers can advantageously be present. The tines or fingers engage through the corresponding cut-outs in the flexible channel and through the side elements 35 and thus permit the placing of the wrapping film around the fiber strand. Now the channel can be moved together by the movement of the side elements 35 and the wrapping metal sheet 30 surrounds the wrapping film 25 with the fiber strand 20 completely, as shown in FIG. 7. The apparatus can be moved together so far due to the finger-shaped cut-outs 32 in the wrapping metal sheet 30 until the desired end diameter or a specific packing density is reached. The bundle diameter is here in direct relationship with the surrounding periphery of the wrapping metal sheet. The film 25 (PE) must be able to slide on the wrapping metal sheet 30 during the moving together. The common coefficient of friction of the selected materials must be selected such that a sliding is possible despite the increasing friction as the compressing increases.

Figure 6:
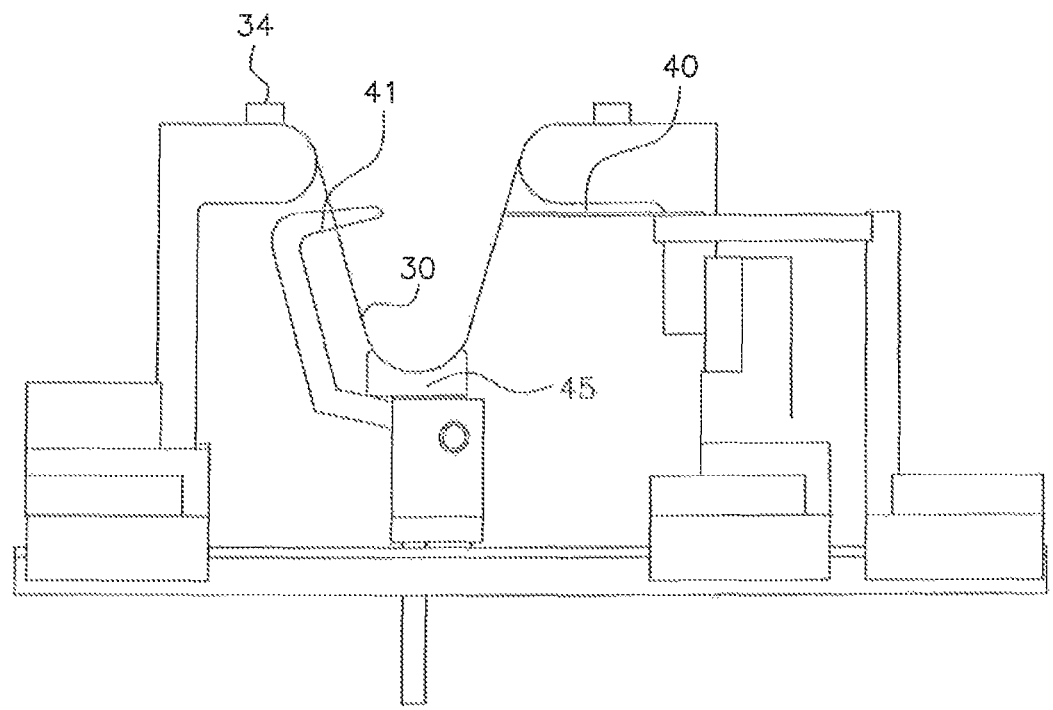
FIG. 6: a side view of the first embodiment of the apparatus in accordance with the invention for the wrapping of a fiber bundle.

As can furthermore be seen in FIG. 6, the wrapping device additionally has a guided support shell 45 with integrated vacuum suction for the fixing of the wrapping film which prevents an uncontrolled outward pivoting and gives shape.

Figure 8:
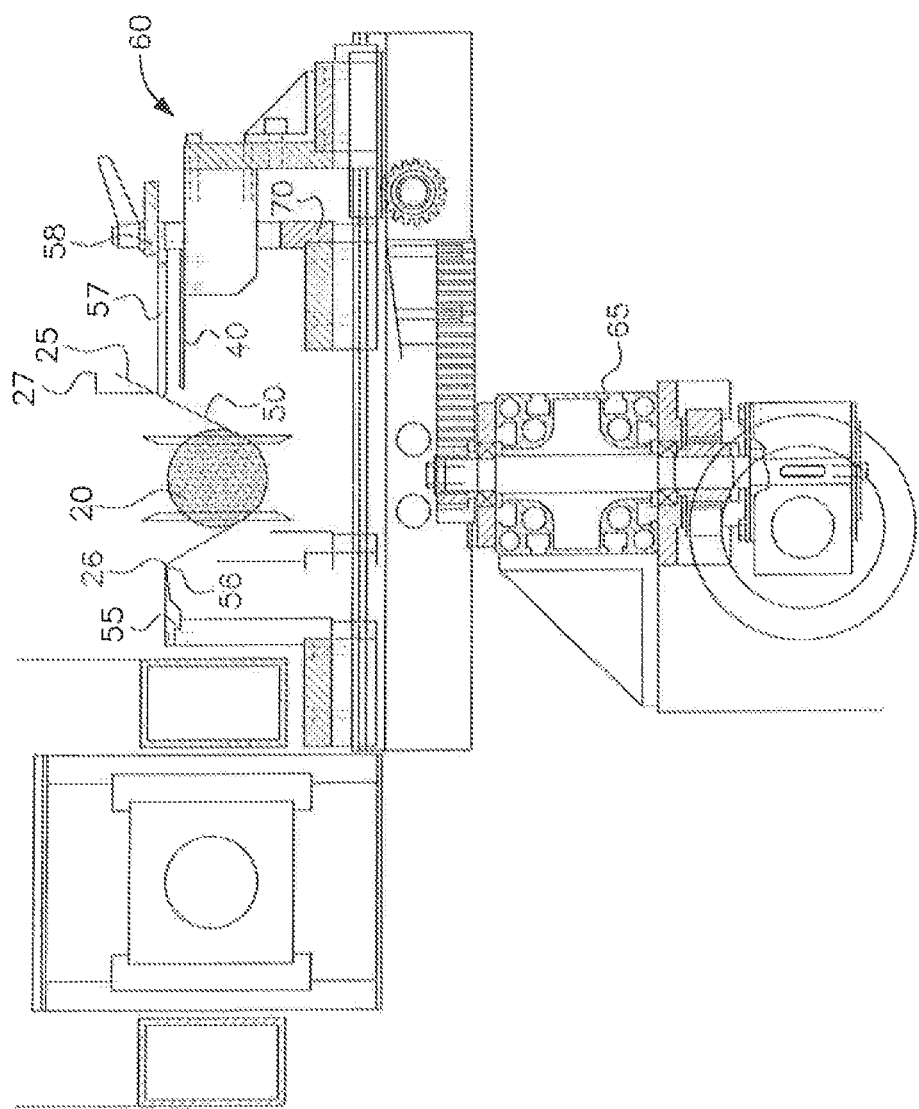
FIG. 8: a first side view of a second embodiment of the apparatus in accordance with the invention for the wrapping of a fiber bundle.

A second embodiment of the wrapping apparatus in accordance with the invention, which is shown in FIGS. 8 to 10, comprises a thin wrapping cloth 50 which is fastened to two rails 55, 57 and sags between them. The wrapping cloth 50 is a gummed fabric cloth which is called a membrane cloth. The rails 55 and 57 can be moved via a drive so that the channel now formed by the wrapping cloth can be moved together. The rail 55 has a knife edge 56 to which the wrapping cloth is fastened, e.g. by adhesive bonding. The oppositely disposed rail 57 has a clamping device 58 via which the wrapping cloth is fastened and by which the depth of the channel can be set.

At the start of the winding, the wrapping film 25 (here: blue PE film) is placed on the membrane cloth 50 sagging in the apparatus. The wrapping film is positioned such that an edge 26 contacts the rail 55 with knife edge 56. After the laying in of the fiber strand 20, the apparatus is moved together. During the moving together, the folding device 40 places the free end 27 of the wrapping film around the fiber strand. The holding rails 55, 57 to which the wrapping cloth is fastened must now be displaced such that the free edge 27 of the wrapping film pushes beneath the oppositely disposed edge 26 which further contacts the knife edge 56. For this purpose, the holding rail moves to the right (on the side with the free end 27 of the wrapping film) closely over the side with the knife edge. When this point is reached, the apparatus can be moved together so far until the desired end diameter or a specific packing density is reached. The bundle diameter is in direct relationship with the set sag and the travel distance of the wrapping cloth 50. The required friction between the wrapping cloth 50 and the wrapping film 25 is decisive for the functioning of this wrapping principle.

Figure 10A:
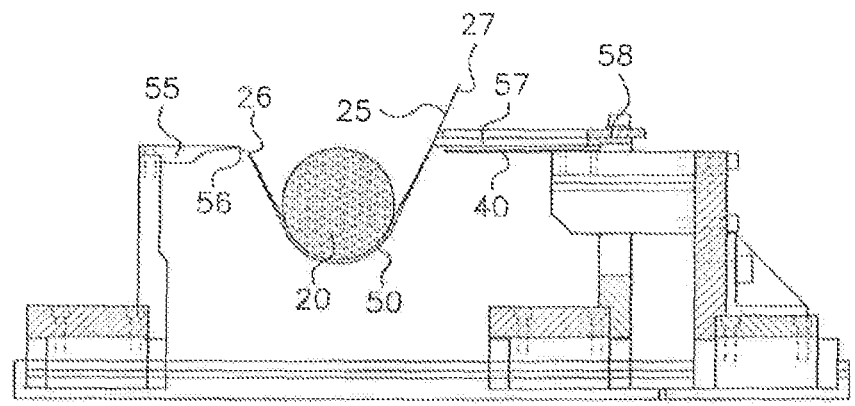
FIGS. 10 *a*-10 *c*: three steps of the wrapping in accordance with the invention of a fiber bundle in accordance with the second embodiment of the apparatus in accordance with the invention for the wrapping of a fiber bundle.
Figure 10B:
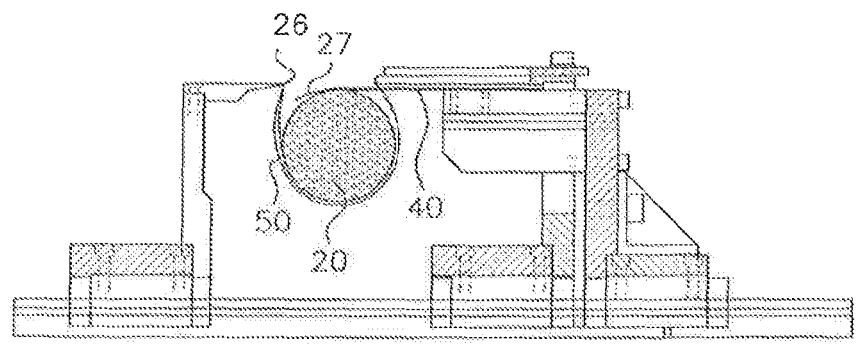
Figure 10C:
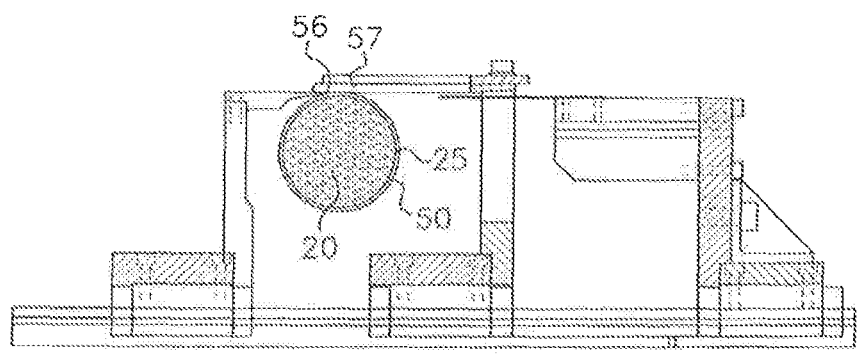

As shown in FIGS. 10*a* to 10*c*, the right hand side 27 of the wrapping film is therefore pushed between the fiber strand and the other end 26 of the wrapping film 25 due to the arising friction between the wrapping cloth and the wrapping film. The requirement for this is that the coefficient of friction between the wrapping cloth 50 and the wrapping film 25 is always larger than the friction of coefficient between the wrapping film and the wrapping film which becomes larger as the degree of compression increases.

What is in particular characterizing for the "winding cloth" method in accordance with the second embodiment with respect to the "winding metal sheet" design in accordance with the first embodiment is:

1) The free projecting end 27 of the wrapping film is inserted between the fiber strand and the fixed end 26 which contacts the knife edge and slides between the fibers and the inner side of the wrapping film on the further compressing. With the wrapping metal sheet, in contrast, the free end of the winding film slides between the wrapping metal sheet and the outer side of the wrapping film.
2) Accordingly, a high friction is required between the film and the cloth in the "wrapping cloth" method, and a low friction between the film and the metal sheet in the "wrapping metal sheet" method.
3) Due to the arrangement of the wrapping cloth, the bundle or the wrapping film can be covered over the whole area (over the whole length and the whole periphery) by the wrapping cloth, only broken by cut-outs for the fixing of the wrapping film by welding or adhesive bonding. With the wrapping metal sheet, in contrast, larger cut-outs are necessary for the overlap of the two wrapping metal sheet sides.

Whereas in the prior art the fiber strands reeled up onto a wheel were wrapped by hand, with irregularities arising, the following improvements can be achieved with the help of the metal film or the wrapping cloth:

The whole wrapping process can be automated.

In an automated process, a very high repetition precision can be achieved with respect to the bundle diameter in the manufacture of the bundles.

A "skewed" wrapping, i.e. an irregular bundle diameter over the bundle length, can be precluded.

The total strand can be wrapped with the film band at once.

The improved geometrical properties of the bundle permit a better handling in the following processes such as a more reliable molding into the filter housing.

Bundles with different diameters can be wound using the wrapping metal sheet or the wrapping cloth. A matching to the respective diameter can be realized in two ways. On the one hand, by the travel distance of the apparatus and, on the other hand, by the sag of the wrapping metal sheet.

In contrast to the use of a steel metal sheet for the wrapping, a controlled compressing and a more uniform end result can be achieved via the directly controllable movement of the channel via the side elements 35 or the rails 55, 57.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. A method of reeling up of fiber bundles on a reel arrangement comprising a reel carrier rotatable around a main axis and at least two reels which are rotatably supported on the reel carrier, with axes of rotation of the at least two reels being perpendicular to the main axis of the reel carrier, and a spacing of the axis of the rotation of the at least two reels from the main axis of the reel carrier being less than radius of rotation of the at least two reels, said method comprising the following steps:

reeling up of the fiber bundle on a first reel;
rotating the reel carrier around the main axis; and
further processing of the fiber bundle on the first reel and simultaneous reeling up of a fiber bundle on the next reel.

2. The method in accordance with claim 1, wherein the fiber, on the reeling up by the rotation of a reel bar, is wrapped around winding mandrels arranged at ends of the reel bar so that the reeled on fiber bundle extends along the reel bar.

3. The method in accordance with claim 2, wherein a length of the fiber bundle amounts to at least three times a length of filter portions of dialysis filters manufactured with the fiber bundles.

4. The method in accordance with claim 2, wherein the reel bar remains in a position substantially parallel to the reel carrier during the further processing step.

5. The method in accordance with claim 2, wherein a pulling tension in the fiber bundle is reduced by displacement of the winding mandrels for the further processing of the fiber bundle.

6. The method in accordance with claim 2, wherein the fiber bundle divided into two by the wrapping up around the winding mandrels is brought into a substantially circular cross-section.

7. The method in accordance with claim 1, wherein the next reel adopts a position previously adopted by the first reel by the rotation of the reel carrier around the main axis.

8. The method in accordance with claim 1, wherein the axis of rotation of the reel carrier coincides with a longitudinal axis thereof, and the reels each substantially include a reel bar with reel heads arranged at ends of the reel bar, the reel heads having winding mandrels, with the reel bars being brought into a position substantially parallel with the reel carrier before the rotation of the reel carrier.

9. The method in accordance with claim 1, wherein
the fiber is provided continuously and is intermediately stored in a storage apparatus, while the next reel is provided by rotation of the reel carrier.

10. The method in accordance with claim 9 wherein
the reel is operated at a higher rotational speed until the fiber stored in the storage apparatus falls below a certain length, whereupon the reel is operated at a lower rotational speed.

11. The method according to claim 9, wherein the fiber is provided by continuous spinning thereof.

12. The method in accordance with claim 9 wherein a tension of the fiber is set via the storage apparatus.

13. The method in accordance with claim 12, wherein the tension of the fiber is measured is a thread tension measuring device and is readjusted as required.

14. The method in accordance with claim 9, wherein the fiber is held under tension via a dancer roll of the storage apparatus.

15. The method according to claim 14, wherein the tension is provided by a low-mass pulling force apparatus.

16. The method according to claim 15, wherein the low-mass pulling force apparatus is a torque-controlled servo motor.

17. The method according 16, wherein the torque-controlled servo motor is employed in conjunction with a smooth toothed belt drive.

18. The method in accordance with claim 1, wherein
the fiber is provided continuously, and
wherein the fluctuating screed of the reeling up is balanced by a storage apparatus.

19. The method in accordance with claim 18, wherein the rotational speed is readjusted upon exceeding or falling below of specific limit values for the fiber stored in the storage apparatus.

20. The method according to claim 18, wherein the fluctuating speed is associated with at least one of start up and stopping of the reel, and rotation of the reel at a substantially constant speed.

21. The method in accordance with claim 1, wherein a first part of the fiber is clamped to the reel, whereupon the reeling up starts and ends after a fixed number of rotations, whereupon an end part of the fiber is also clamped to the reel.

22. The method in accordance with claim 1, wherein, after the reeling up of the fiber bundle on first reel, the fiber is taken up by a transfer grip, is cut, and is transferred to the next reel after rotation of the reel carrier.

23. The method in accordance with claim 1, wherein loose ends of the fiber are suctioned via a suction apparatus.

24. The method in accordance with claim 1, wherein the fiber bundle is wrapped with a film band in the further processing, a length of the film band corresponding to a length of the fiber bundle.

25. The method in accordance with claim 24, wherein the fiber bundle is compressed by the wrapping with the film band.

26. The method in accordance with claim 24, wherein the film band wrapped around the fiber bundle is fixed.

27. The method according to claim 26, wherein the film band that is wrapped around the fiber bundle is fixed by welding.

28. The method according to claim 1, wherein the fiber bundles are fiber bundles.

29. The method according to claim 28, wherein the hollow fiber membrane bundles are for a dialysis filter.

30. The method in accordance with claim 1, wherein the fiber bundle is cut into a plurality of smaller bundle portions during the further processing.

31. A method of manufacturing dialysis filters from fiber bundles reeled up on a reel arrangement including a reel carrier rotatable around a main axis and having at least two reels which are rotatably supported on the reel carrier, with axes of rotation of the at least two reels being perpendicular to the main axis of the reel carrier, and a spacing of axes of rotation of the at least two reels from the main axis the reel carrier being less than a radius of rotation of the at least two reels, said method comprising the following steps:
reeling up of a fiber bundle on a first reel;
rotating the reel carrier around the main axis;
further processing of the fiber bundle on the first reel and simultaneous reeling up of a hollow fiber membrane bundle on a next reel;
cutting the fiber bundle into at least two bundle portions; and
manufacturing a dialysis filter from each of the at least two bundle portions.

* * * * *

UNITED STATES PATENT AND TRADEMARK OFFICE
CERTIFICATE OF CORRECTION

PATENT NO. : 8,764,925 B2  
APPLICATION NO. : 13/666142  
DATED : July 1, 2014  
INVENTOR(S) : Barra et al.

Page 1 of 1

It is certified that error appears in the above-identified patent and that said Letters Patent is hereby corrected as shown below:

In the Claims

Claim 1, column 18, line 60, change "comprising" to --including--;
  line 64, change "axis" to --axes--;
  line 65, after "than" add --a--; and
 column 19, line 4, change "the" to --a--.

Claim 13, column 19, line 49, change "measured is" to --measured via--.

Claim 18, column 20, line 3, change "screed" to --speed--.

Claim 28, column 20, line 36, change "fiber bundles" to --hollow fiber membrane bundles--.

Claim 31, column 20, line 43, change "fiber" to --hollow fiber membrane--;
  line 54, change "fiber bundle" to --hollow fiber membrane bundle--; and
  line 57, change "fiber bundle" to --hollow fiber membrane bundle--.

Signed and Sealed this
Tenth Day of February, 2015

Michelle K. Lee
*Deputy Director of the United States Patent and Trademark Office*